(12) United States Patent
Lucas et al.

(10) Patent No.: US 12,015,939 B2
(45) Date of Patent: Jun. 18, 2024

(54) MESH NETWORK CONNECTION QUALITY

(71) Applicant: Alarm.com Incorporated, Tysons, VA (US)

(72) Inventors: Austin Lucas, Tysons, VA (US); Gustaf Nicolaus Maxwell Lonaeus, Washington, DC (US); Kyle Rankin Johnson, Falls Church, VA (US); Adam Feinstein, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 40 days.

(21) Appl. No.: 17/142,763

(22) Filed: Jan. 6, 2021

(65) Prior Publication Data

US 2021/0211910 A1 Jul. 8, 2021

Related U.S. Application Data

(60) Provisional application No. 62/957,488, filed on Jan. 6, 2020.

(51) Int. Cl.
*H04W 24/08* (2009.01)
*H04W 84/18* (2009.01)

(52) U.S. Cl.
CPC ............ *H04W 24/08* (2013.01); *H04W 84/18* (2013.01)

(58) Field of Classification Search
CPC ..... H04W 24/08; H04W 84/18; H04W 24/06; H04W 24/02; H04W 24/04
See application file for complete search history.

(56) References Cited

U.S. PATENT DOCUMENTS

| 2004/0008663 A1 | 1/2004 | Srikrishna et al. |
| 2006/0187885 A1 | 8/2006 | Roy et al. |

(Continued)

FOREIGN PATENT DOCUMENTS

| EP | 2699040 | 2/2014 |
| EP | 2802167 | 11/2014 |

(Continued)

OTHER PUBLICATIONS

De La Cruz, Beth-uel, "How to Optimize Wi-Fi for Smart Homes," Home Alarm Report, Aug. 11, 2019, Retrieved on Feb. 27, 2021 from <https://homealarmreport.com/smart-home/how-to-optimize-wifi/>, 6 pages.

(Continued)

*Primary Examiner* — Jae Y Lee
(74) *Attorney, Agent, or Firm* — Fish & Richardson P.C.

(57) ABSTRACT

Methods, systems, and apparatus, including computer programs encoded on computer-storage media, for mesh network connection quality testing. In some implementations, a method for mesh network connection quality testing includes transmitting, by a control unit of a monitoring system that is configured to monitor a property, test data to a first connected component of the monitoring system; in response to transmitting the test data, receiving, by the control unit, response data from the first connected component of the monitoring system; based on the response data, determining, by the control unit, a link quality indicator that reflects a strength of a connection between the control unit and the first connected component; and based on the link quality indicator, adjusting, by the control unit, one or more settings of the connection between the control unit and the first connected component.

20 Claims, 4 Drawing Sheets

(56) References Cited

U.S. PATENT DOCUMENTS

| | | |
|---|---|---|
| 2007/0070911 A1 | 3/2007 | Goldberg et al. |
| 2008/0198036 A1* | 8/2008 | Songkakul .............. H04W 4/80 |
| | | 340/4.32 |
| 2010/0061272 A1* | 3/2010 | Veillette .............. H04W 40/005 |
| | | 370/254 |
| 2010/0204847 A1 | 8/2010 | Lette, III et al. |
| 2015/0288868 A1 | 10/2015 | Slavin et al. |
| 2016/0044522 A1* | 2/2016 | Ludlow .............. H04L 43/0811 |
| | | 370/252 |
| 2016/0157173 A1 | 6/2016 | Shen |
| 2016/0202677 A1 | 7/2016 | Trundle et al. |
| 2020/0404513 A1* | 12/2020 | Hayes ................... H04W 48/10 |
| 2021/0211905 A1* | 7/2021 | Rimhagen ............... H04W 4/80 |

FOREIGN PATENT DOCUMENTS

| | | |
|---|---|---|
| WO | WO 2018/005976 | 1/2018 |
| WO | WO 2019/177505 | 9/2019 |

OTHER PUBLICATIONS

PCT International Search Report and Written Opinion in International Search Application No. PCT/US2021/012292, dated Mar. 23, 2021, 13 pages.

Extended European Search Report in European Appln. No. 21737982.5, dated Jun. 2, 2023, 14 pages.

\* cited by examiner

MESH NETWORK CONNECTION QUALITY

CROSS-REFERENCE TO RELATED APPLICATION

This application claims the benefit of U.S. Provisional Application No. 62/957,488, filed on Jan. 6, 2020, the contents of which are incorporated by reference herein in its entirety.

BACKGROUND

Many properties are equipped with monitoring systems that include sensors and connected system components.

SUMMARY

Many residents and homeowners equip their properties with monitoring systems to enhance the security, safety, or convenience of their properties. The monitoring system can include a variety of different, individual sensors and relays that communicate via a network of some kind. Mesh networks are a method of communication between these different, individual sensors and relays, referred to generally as nodes, such that a data packet passed from one node to another may pass through a number of other nodes on the same network before reaching its destination.

Nodes can be sensors, relays, or other electronic devices capable of generating data passing data, and/or performing an action. Sensors can be anything capable of capturing information that reflects the environmental surroundings of the sensor (e.g. video cameras, infrared cameras, motion sensors, microphones). Relays can be anything used to transfer data that is not also a sensor. Electronic devices can include devices that perform an action or function, such as electronic door locks.

In one aspect, the disclosure provides a method including transmitting, by a control unit of a monitoring system that is configured to monitor a property, test data to a first connected component of the monitoring system; in response to transmitting the test data, receiving, by the control unit, response data from the first connected component of the monitoring system; based on the response data, determining, by the control unit, a link quality indicator that reflects a strength of a connection between the control unit and the first connected component; and based on the link quality indicator, adjusting, by the control unit, one or more settings of the connection between the control unit and the first connected component.

In some implementations, the method further includes obtaining, by the control unit, a first route including a first set of one or more nodes in a mesh network that were used to transfer the test data from the control unit to the first connected component; obtaining, by the control unit, a second route including a second set of one or more nodes in the mesh network that were used to transfer the test data from the control unit to the first connected component; determining, by the control unit, that the first route and the second route are different; in response to determining that the first route and the second route are different, incrementing, by the control unit, a value of a route counter; and determining, by the control unit, the link quality indicator based on the value of the route counter.

In some implementations, transmitting the test data includes obtaining, by the control unit, a time window including a starting time and an ending time; and transmitting, by the control unit, the test data to the first connected component of the monitoring system from the starting time until the ending time.

In some implementations, the method further includes determining, by the control unit, a first number of data packets of the test data that successfully reached the first connected component within the time window and a second number of data packets of the test data that did not successfully reach the first connected component within the time window based on the response data; and determining, by the control unit, the link quality indicator based on the first number of data packets and the second number of data packets.

In some implementations, the method further includes generating, by the control unit, a successful transmission rate based on a number of data packets that successfully reach the first connected component within the time window; and determining, by the control unit, the link quality indicator based on the successful transmission rate.

In some implementations, the method further includes generating, by the control unit and based on the link quality indicator, configured data that is configured to enable a display of a user device to represent the link quality indicator; and sending, by the control unit, the configured data to the user device.

In some implementations, the test data includes a plurality of data packets and the response data includes a number of response data packets corresponding to one or more data packets of the plurality of data packets that successfully arrived at the first connected component.

In some implementations, the response data includes a route of one or more nodes in a mesh network that were used to transfer at least part of the test data from the control unit to the first connected component.

In some implementations, the route is a list of values representing each of the one or more nodes, and where a value of the list of values is generated by a second connected component that connects the control unit to the first connected component as a node within the route of the mesh network.

In some implementations, the response data further includes a first node link quality indicator of a first node of the one or more nodes in the route and the method further includes: determining, by the control unit, that the first node link quality indicator does not satisfy a determined link quality indicator threshold; and in response to determining that the first node link quality indicator does not satisfy the determined link quality indicator threshold, performing, by the control unit, connection diagnostics.

In some implementations, the connection diagnostics include determining a power level of the first node and comparing the power level of the first node to a power level threshold.

In some implementations, the response data further includes a first node power level of a first node of the one or more nodes in the route and the method further includes: determining, by the control unit, that the first node power level does not satisfy a determined power level threshold; and in response to determining that the first node power level does not satisfy the determined power level threshold, adjusting, by the control unit, a power level of the first node.

In some implementations, the response data includes a plurality of analytic indicators, and where determining the link quality indicator includes combining two or more analytic indicators of the plurality of analytic indicators to generate the link quality indicator.

In some implementations, the plurality of analytic indicators include a route counter value that represents a number of routes that were used to transfer the test data from the control unit to the first connected component through a mesh network, where each route of the number of routes corresponds to a set of one or more nodes in the mesh network.

In some implementations, adjusting the one or more settings of the connection between the control unit and the first connected component include: sending, by the control unit, a signal to a second connected component that connects the control unit and the first connected component, where the signal is configured to adjust a power level of the second connected component.

In some implementations, transmitting the test data to the first connected component of the monitoring system includes: determining, by the control unit, a first power level for a first data packet of the test data; and transmitting, by the control unit, the first data packet of the test data using the first power level.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The details of one or more implementations of the subject matter described in this specification are set forth in the accompanying drawings and the description below. Other features, aspects, and advantages of the subject matter will become apparent from the description and the drawings.

Figure 1:
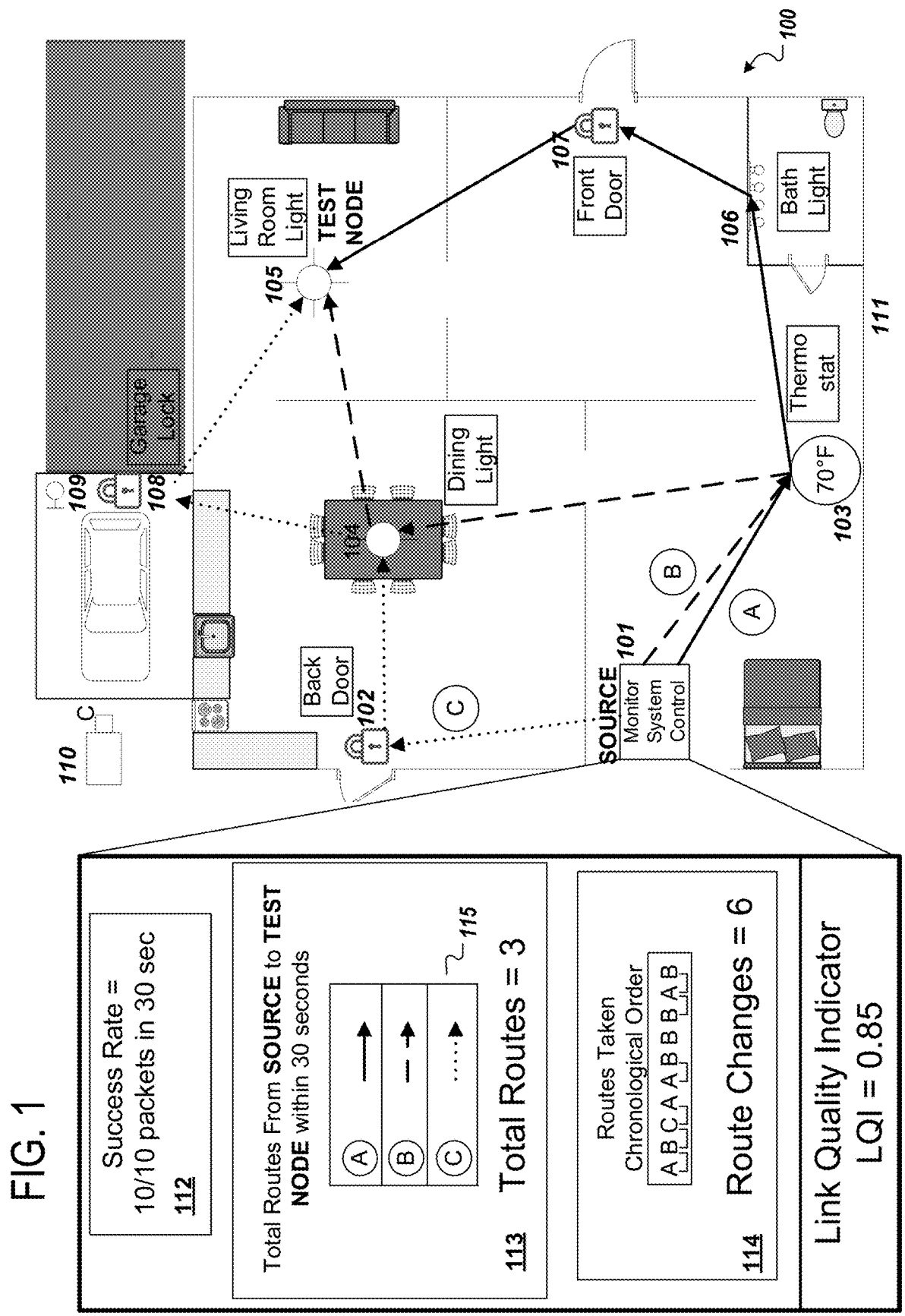
FIG. 1 is a diagram illustrating an example of a system for mesh network connection quality testing.

FIG. 1 contains a diagram showing an example monitoring system 100 (monitor system control 101 together with all nodes, sensors, relays and connected devices) and the results of a mesh network connection quality test.

The diagram in FIG. 1 shows one level of a house, the property 111, with 4 separate rooms and bathroom. The property 111 can be a home, another residence, a place of business, a public space, or another facility that is monitored by a property monitoring system. The monitoring system includes one or more sensors and electronic devices located at the property 111 that collect data related to the property 111. The front door of the property 111 includes an electronic door lock 107 that can be locked and unlocked remotely. The bedroom includes a thermostat 103 that can be controlled remotely. The dining room includes a dining room light 104 that can be turned on and off remotely.

The connected components, 102, 103, 104, 105, 106, 107, 108, 109, and 110, communicate with the monitor system control 101 depicted in FIG. 1.

The connected components may communicate with the monitoring system 100 through a network. The network can be any communication infrastructure that supports the electronic exchange of data between the monitoring system control 101 and the one or more connected components. For example, the network may include a local area network (LAN). The network may be any one or combination of wireless or wired networks and may include any one or more of Ethernet, Bluetooth, Bluetooth LE, Z-wave, Zigbee, or Wi-Fi technologies.

The control unit 101 can be, for example, a computer system or other electronic device configured to communicate with the network and connected components of the monitoring system 100. The control unit 101 can also perform various management tasks and functions for the monitoring system. In some implementations, the residents of the property, or another user, can communicate with the control unit 101 (e.g., input data, view settings, or adjust parameters) through a physical connection, such as a touch screen or keypad, through a voice interface, and/or over a network connection.

FIG. 1 shows, on the right, a floorplan of the property 111 containing various components of the monitoring system 100 of the property 111. The monitoring system 100 is engaged in a mesh connection quality test between the control unit 101, referred to here as the source, and the node currently being tested, the living room light 105. The mesh connection quality test can help determine whether or not the test node is securely within the network. It can also give data about neighboring nodes or other metrics related to connection. These analytics can be captured and presented to the user both graphically and numerically to inform manual maintenance or internally to the system where automatic system components can make adjustments.

On the left, FIG. 1 shows a number of analytics captured by the monitor system 100 as part of the process of determining mesh network connection quality between the source node, control unit 101 and the test node, living room light 105. This specific test showed that ten out of ten test data packets successfully arrived at the living room light 105 from the control unit 101 within the time window of thirty seconds. This test also showed that there were three different communication routes for the ten data packets sent between the control unit 101 and the living room light 105. The communication routes of consecutive packets were different six times. The data collected from this specific test can result in a number of different numerical scores depending on range scale and weighting factors. In this specific test, the resulting link quality indicator is 0.85 on a scale of zero to one suggesting that this connection between the control unit 101 and living room light 105 is healthy but not perfect.

In some implementations, the scale of the LQI value can be different. For example, zero to one hundred or assigning alphabetic qualifications or simplified quality indicators. An example of a simplified quality indicator could be a green mark for a good connection that does not require attention, a yellow mark for a connection that can be improved, and a red mark for a connection that is broken. The number of values displayed to user to represent this connection quality, can also be different. There are many different analytics that can be captured as the data packet from the source, system control 101, makes its way to the test node, living room light 105. For example, the rate of travel, the quality of nodes being passed through, any unexpected delays, or the behavior of the routes especially when avoiding certain nodes can all be used. Any combination of the number of communication routes, the number of route changes, rate of travel, quality of nodes being passed through, unexpected delays, or the behavior of the routes can be used to determine the quality of the connection between two nodes in a mesh network.

The network connection quality test relies on the data packets sent from the system control 101 to a test node, in this case, the living room light 105. A subset of the analytics which can be collected are shown on the left of FIG. 1. These analytics can be processed by the monitoring system 100. For each node to be tested, there may be a certain amount of time in which the source node may send test data packets to the test node. Once the test data packet successfully arrives at the test node, the test node sends an acknowledgment back to the source containing a success signal as well as analytics based on the route which the test data packet traversed.

The different routes taken by the test data packets are shown in FIG. 1 with different style arrows marked A, B, and C. Path A traverses from the monitor system control 101, to the thermostat 103, to the bath light 106, to the front lock 107, to the living room light 105 that is the test node. Path B traverses from the monitor system control 101, to the thermostat 103, to the dining light 104, to the living room light 105 that is the test node. Path C traverses from the monitor system control 101, to the back door 102, to the dining light 104, to the garage lock 108, to the living room light 105 that is the test node.

Depending on implementations and the connection setup, these routes could be different and could be made up of less or more nodes. For example, an additional camera could be placed on property 111 near the dining light 104. The additional camera could then be chosen as part of a route to communicate from the monitor system control 101 to the living room light 105.

Within the system 100, some nodes may have the ability to move around affecting data routes. For example, an autonomous vacuum cleaner may roam about a house. While roaming, the vacuum cleaner may connect with various other nodes in order to send signals. The logic to listen for transmissions in range and find out which nodes in a system are neighbors can be built into the communication protocol used by the nodes. In a variety of situations, the system 100 may request that each node ask which nodes in the system are the node's neighbors. By performing this action, neighbors may be identified for each node.

In some implementations, nodes that were not used could have been used. For example, garage light 109 could have been included in route C after the route connected with the garage lock 108 before connected with living room light 105. Garage light 109 could have been included in other ways too. Nodes that were used, need not to have been used. For example, route A and route B could have connected monitor system control 101 with dining light 104 instead of thermostat 103. In this way, thermostat need not have been used. Nodes that appear in this example need not appear in every embodiment as different properties can have different connected components available. Routes taken can also vary even within the same subset of nodes depending on time, location, and other network/node factors. For example, if a node were to be disconnected, switched off, or become non-functional, no route would then pass through it.

Garage camera 110 and garage light 109 are not used during this particular test. This can happen to one or many nodes during any particular test on any particular system as the test data packets are constantly trying to find an efficient way to get from source to test node. For example, if a particular node is on the opposite side of a property from a direct path between the source and test node, there's a higher probability that the particular node will not be involved in any routes between the two compared with another node that is directly between the source and test node. Multiple tests with different nodes can help the coverage of the network test.

The test data packets involved in each route, A, B, and C, may all go through the same process at each node through which they traverse. Each node traversal adds a value onto the path parameter denoting the specific node traversed. In this way, a list is generated as the packet jumps from node to node on its journey from source to test node. The list is carried by each test data packet. The full list is sent back when the test data packet is successfully acknowledged at test node, the living room light, 105. This data, together with timestamps and frequency data, can be used to gather information about node connections and the network as a whole.

The box on the left side of FIG. 1 contains 3 factors which impact the monitoring system's 100 determination of a particular nodes link quality indicator (LQI).

Box 112 on the left of FIG. 1 is related to success rate, the number of packets successfully registered at the test node over the total number of packets sent from the source to test node. In some implementations, the test design is to send as many packets as possible until a given time interval is reached. In this example, the time interval is thirty seconds. Box 112 uses the following results: the number of test data packets sent is ten, the window for test data packets to be sent is thirty seconds long, and the number of successfully acknowledged test data packets, that is, data packets sent from the monitor system control 101, which is the source, to the living room light 105, which is the test node, is ten. From these facts, the example shows a subset of the analytics which can be captured. The rate of success for data packets is 100%. Ten out of a possible ten test data packets have made their way to the test node and reported back a successful network traversal. However, only ten packets have been sent. A strong connection could possibly send more packets in the same amount of time making a higher effective frequency. The high success rate positively affects LQI while a low effective frequency negatively affects the LQI score.

Box 113 on the left of FIG. 1 displays all three routes taken by test data packets. The arrow styles used in routes A, B and C within chart 115 correspond to the arrow styles used in the property 111 diagram on the right for the same route. The chart 115 within 113 on the left displays the name of each node which corresponds to the label shown in rectangular boxes within the diagram on the right. Path A traverses from the monitor system control 101, to the thermostat 103, to the bath light 106, to the front lock 107, to the living room light 105 that is the test node. Path B traverses from the monitor system control 101, to the thermostat 103, to the dining light 104, to the living room light 105 that is the test node. Path C traverses from the monitor system control 101, to the back door 102, to the dining light 104, to the garage lock 108, to the living room light 105 that is the test node. The ten data packets of our example traverse a total of three separate routes, the path of which can be seen as arrow jumps from node to node. Note that path A and path C contain five nodes while path B contains four. There is no particular number of nodes which is required. However, the more total routes taken within a specific test can be linked to certain network properties like unstable network performance.

Box 114 on the left of FIG. 1 displays the number of route changes. Paths are made in segmented fashion with each node deciding where to extend the route. Once the data packet has reached its location successfully, the route it traveled on can also be considered a success. For the next data transfer between the same two nodes, the system can try first to replicate the previously successful path. If retrying that path results in any problem, then a different route will be taken. In some implementations, the first route attempted for a data packet could be different from the last successful route. By tracking the route changes, the monitoring system can get analytics on the stability of the network connections. This, together with the number of total routes available, can affect the LQI of the connection. For example, assuming that the success rate was 100%, a case in which there were no route changes could produce an LQI of one, within an implementation which scales LQI from zero to one. In the same example but with the changes grouped, meaning that a particular route was chosen a number of times in a row before any other route was chosen, an LQI could still be above 0.90. In this case, the route variability would be lower and thus likely more reliable than fast switching counterparts. Considering again the same example but with the routes changing seemingly randomly, an LQI measurement would likely be below 0.90, depending on implementation, which can serve as a warning for low reliability and therefore link quality. This is the system shown in FIG. 1.

Box 114 of FIG. 1 shows a chronological progression of the routes taken by each individual data packet. First, path A was taken, then B was taken causing a change route parameter to increment by one. Then C was taken causing the change route parameter to increment again by one. The 10 letters shown in box 114 represent the 10 data packets sent from the source, monitor system control 101, to test node, living room light 105. The total route changes within this test is 6. While this is not ideal, for the purposes of LQI, a worse situation still could be a system in which no packets were able to traverse the network at all.

The three boxes 112, 113, and 114 on the left of FIG. 1, together with the culminating LQI number given, can be used to instruct the user of monitoring system 100 of any issues within the network. When the LQI number is low, or a correlated graphical display simplifying LQI (e.g. red x's, caution signs), it can prompt further investigation into the numerous analytics compiled by the connection test. These analytics can then be used to make a determination of how best to adjust the network for improved results. In some instances, this process can be done automatically where the monitoring system itself, without needing the input from users or owners, can make the requisite network changes. In the automatic adjustment case, the monitoring system could use the same data gathered during the connection test shown in FIG. 1.

Figure 2:
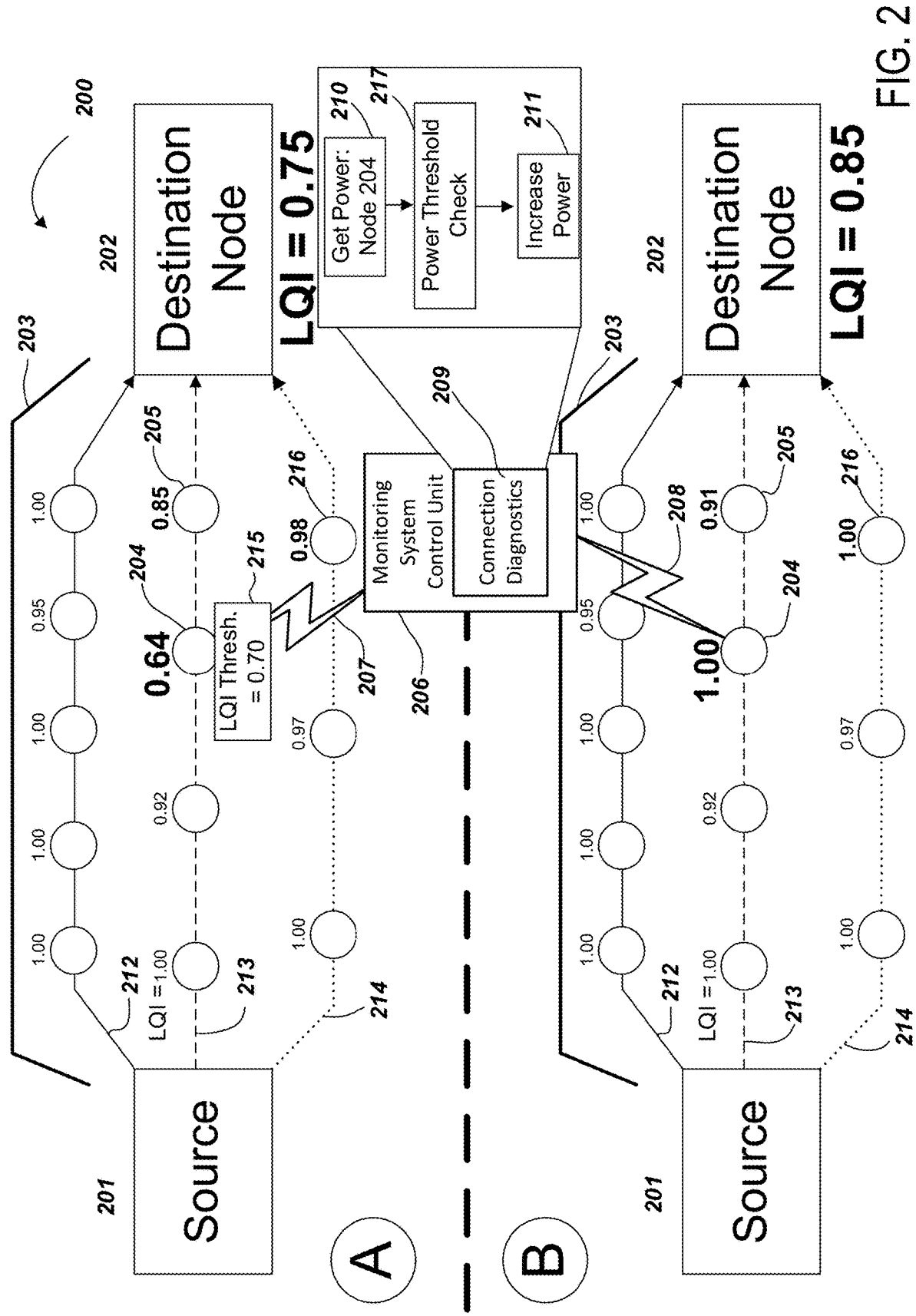
FIG. 2 is a diagram illustrating an example of monitoring system network diagnostics.

FIG. 2 is a diagram illustrating a monitoring system 200 communicating from a source node 201 to a destination node 202 via a mesh network of other nodes 203. Both the source node 201 and the destination node 202 can be anywhere on the mesh network. Three distinct paths are shown from the source node 201 to the destination node 202. While three are shown, any number of paths can be created from node to node during communication. On this specific network, a threshold requirement is in place. In this case, the threshold 215 requires all nodes to have at least an LQI of 0.70. Other threshold values and parameters and/or multiple thresholds can be used on different monitoring systems or the monitoring system 200. In FIG. 2, a node 204 is below the system threshold of 0.70 LQI, as measured relative to the source, and is detected by the system automatically during the source node 201 to the destination node 202 communication. The communication could be a test or another instance where data passes from source to destination on the network. The diagram is split into sections A and B. Section A is the initial situation where an issue on node 204 is detected. Section B is the situation after monitoring system control unit 206 automatically adjusts the node 204.

In FIG. 2, the number above each of the network of nodes 203 as well as specific nodes 204, 205 and 216 is the LQI of the specific node. Three separate paths are shown that exist as three separate mesh network routes for data to travel from the source node 201 to the destination node 202. The three paths are path 212, path 213 and path 214. In some implementations, there may be a maximum number of intermediate nodes. Intermediate nodes (e.g., nodes along path 212, nodes along path 213, nodes along path 214) can also be referred to as hops. Path 212 contains nodes that all have above an LQI of 0.95 and do not fall below the current system threshold 215 for LQI. Path 214 contains nodes that all have an LQI greater than 0.95 and do not fall below the current system threshold 215 for LQI. However, path 213 contains a node that has an LQI below the current LQI threshold 215 of 0.70. The current LQI threshold value 215 can be changed either manually or automatically by the system.

The threshold 215 need not be of the LQI parameter. In a given implementation, any collected piece of analytics from the monitoring system 200 could be used as a threshold. For example, a threshold can be included for a maximum number of nodes within a route. Any route having more than the maximum allowed could be avoided either by manual changes to the monitor system setup or automatic adjustments. Similarly, a threshold can be put on the time it takes for particular nodes to respond. Any nodes that take longer than this threshold limit could be targeted by connection diagnostics components where an analysis can be done and resolution reached requiring either manual or automatic changes to the network. Another example could be the tracking of individual node power consumption where power consumption can refer to the level of radio transmission power and its effect on battery life or energy usage. In this example, nodes consuming too much power could be automatically tuned by the monitoring system or the monitoring system could send alerts to take manual action. Other parameters not mentioned could also be monitored in similar fashion.

The threshold used need not be static. In some implementations, dynamic quantities adjusted via the monitoring system 200 can be used. These dynamic quantities can be informed by models, machine learning or other system logic. Any combinations of different parameters could be monitored simultaneously. For example, a specific group of parameters may each have a given threshold. The monitoring system can apply multiple thresholds at the same time. The specific parameters monitored need not be static but could dynamically change depending on other factors measured within the monitoring system.

In section A of FIG. 2, path 213, a mesh network route connecting the source node 201 with the destination node 202, contains a node 204 that has an LQI value of 0.64 which is below the LQI threshold of 0.70 shown in 215. The monitoring system 206 can send and receive signals to all nodes in the system 200. These signals can contain relevant node data including LQI data. Signal 207 represents one of these connections from the monitoring system control unit 206 to node 204. Signal 207 sends a block of information which includes the LQI of node 204 to monitoring system control unit 206. Based on the LQI of node 204, the monitoring system control unit 206 performs connection diagnostics 209 to diagnose the issue. The software, parameters and functions required to run connection diagnostics 209 can be located within the control unit 206 data storage or may be connected to the control unit 206 from a remote location. The control unit can gather more data from a specific node or the system in general based on the connection diagnostics 209. By performing the connection diagnostics 209 and collecting data on the node 204 and the system 200, the control unit 206 can determine possible issues with the node. The monitoring system control unit 206 can then automatically adjust the system to fix the issue and/or send an alert to the user detailing both the issue and method of solution if one exists.

In some implementations, an event during testing (e.g., low LQI score, un-responsive node) can prompt various actions by the control unit 206. For example, if a low LQI is measured at a given node, the control unit 206 can elect to check if the given node is marked by a preexisting failure. The control unit 206 can also attempt to reestablish communication by asking other nodes in the system 100 to rediscover their neighbors. In this way, the node with a low LQI score can be rediscovered by a neighbor.

In FIG. 2, monitoring system control unit 206 gets a power reading 210 from node 204. This power reading is compared with a system threshold for power 217 within connection diagnostics 209. By comparing the power reading 210 with the power threshold 217, the connection diagnostics 209 determines node 204 is low on power which is affecting LQI. In other situations, low LQI detected at node 204 could be the result of low power at a different node or another issue all together. Issues on another node within the mesh network collection of nodes 203 could potentially cause LQI issues for any other node within the monitoring system 200. In this example, the connection diagnostics 209 determine that node 204 is operating on power reading 210 and the solution is reached by means of software, neural networks, or other internal logic to increase power 211. The monitoring system control unit 206 can send a signal 208 to node 204 containing instructions to increase the power.

The situation of signal 208 connecting control unit 206 to node 204 is shown in section B of FIG. 2. Based on the connection diagnostics 209 performed by the control unit 206, signal 208 is sent to increase the operating power of node 204. This operation can be used for nodes where the current power is below a maximum. For example, if the power level of a node was previously lowered, the current power level would be below the maximum and increasing the operating power would be an option. The system need not have adjusted only one node. It could be that the connection diagnostics 209 finds multiple nodes that may need to be adjusted. In that case, the monitoring system control unit could adjust multiple nodes. In the example shown in FIG. 2, the monitoring system control unit 206 only adjusts one node. It also could be the case that manual adjustments need to be made to correct an issue. In this case, an alert would be sent to the user detailing the issue and routes for possible resolution.

The control unit 206 in FIG. 2 could potentially find other issues within the system and is not limited to low node power. Examples of other possible network issues affecting quality include physical obstructions within the property which can decrease connection ability. In this case, if a connected component capable of moving the obstruction existed on the property, the monitoring system could activate the connected component to move the obstruction. If a connected component capable of moving the obstruction did not exist on the property, the monitoring system could send an alert to the user detailing the issue and proposed solution. Another issue which could potentially require user interference would be weak or non-existent routes between nodes. In this situation, a possible solution could require either the moving, or the addition, of individual nodes to bridge a distance between nodes. Other issues requiring user interference could arise. In each case, the monitoring system could check if any automatic solution is available. An alert to the user could also be transmitted.

In section B of FIG. 2, the nodes of route 212 have the same LQI values as the nodes of route 212 in section A, before the power increase of node 204. The nodes of route 213 and 214 however, have slightly different values after the power adjustment made on node 204 by the monitoring system control unit 206. The LQI of node 204 increased from 0.64 to 1.00. Because the monitoring system 200 is a mesh network and each node's connection relies to varying degrees on all other nodes in the network, node 204 need not be the only node affected by the power increase on node 204. In section A, which is the situation before the node 204 power adjustment, node 205, which also happens to be on route 213, has an LQI of 0.85. In section B, which is the situation after the node 204 power adjustment, the LQI value of node 205 increases to 0.91. It can be inferred from this example that the power adjustment that increased the LQI of node 204 had the additional effect of increasing the LQI of node 205.

Section B of FIG. 2 also shows node 216 on route 214 was also affected by the power adjustment performed on node 204. Node 216 increased from an LQI of 0.98 in section A to an LQI of 1.00 in section B after the power adjustment to node 204. It can be seen here as well that the power adjustment on node 204 likely affected node 216. Note that nodes may be affected that are not on the same route as the node that was adjusted. This can be true when considering some parameters. For example, mesh network parameters for nodes like LQI which are affected by neighboring nodes and other nodes in the system, may change based on indirect adjustment to other nodes.

Section B of FIG. 2 shows the destination node 202 is also affected. The LQI of the destination node 202 increases from an LQI of 0.75 before the power adjustment on node 204 in section A to an LQI of 0.85 after the power adjustment in section B.

In some implementations, the LQI threshold 215 can be a different value. For example, a threshold of 0.90 and not 0.70. In this case, the system could perform further connection diagnostics after section B as there would still be nodes not satisfying the given threshold. The control unit 206 would register node 202 in section B as not meeting the 0.90 LQI threshold. The monitoring system control unit 206 could then run the same connection diagnostics 209 on node 202. The solution to increase the LQI could be further power increases within the network or other possibilities. In some implementations, threshold parameters could include limits to connection diagnostics. Examples of limits could be the number of times a connection diagnostic suite is run during a given transfer attempt or test. Another example could be a limit on the number of times a connection diagnostic suite is run over a given time frame.

The LQI thresholds and subsequent increases shown in FIG. 2 come at the cost of increasing the power of node 204. Other thresholds for different parameters can be included to avoid increasing power above a certain limit in the search for high LQI values or other parameters for nodes. Parameters collected by the monitoring system 200 can be monitored and dealt with automatically by the system. FIG. 2 shows power being the tool that increases LQI. In this example, LQI is the only parameter with a threshold.

In some implementations, it may be advantageous to include additional thresholds like a power threshold for each node. For example, each node could be scanned with two numbers by the monitoring system control unit 206. One number could be LQI, the other could be power consumption. Additional parameters could be added and neither power consumption nor LQI need be included in every monitoring setup. With both LQI and power consumption monitored, the system could proceed in the same way as is shown in FIG. 2, with a detection of low LQI on node 204. The monitoring system 206 could run connection diagnostics 209 and determine a power increase is necessary. If the power increase to compensate for low LQI drove the power consumption of the node 204 above the power consumption threshold, the monitoring system control unit 206 could limit the power. Cost functions, machine learning or other dynamic processes could determine what values to set parameters to on specific nodes in the case where meeting one, or several, threshold(s) would involve not meeting one or others. In some implementations, the monitoring system control unit 206 could favor adjustments that would cause the greatest number of parameters meet their threshold targets. In other implementations, the monitoring system control unit 206 could favor adjustments in which specially weighted parameters carry more value and the monitoring system control unit 206 could maximize a resulting cost function. Other implementations could also be implemented to deal with the tradeoffs between parameters on the monitoring system 200 involving logic performed within the monitoring system 200 or externally by users or central servers.

In some implementations, tests can be conducted to discover lower viable transmission powers. For example, a test can be run at lower transmission powers where the number of packets sent successfully can be stored with other relevant data (e.g., route, traffic load, time of day, etc.). The stored data can be compared with tests run at higher or lower transmission powers to discover network settings which minimize power consumption while maximizing connectivity.

Figure 3:
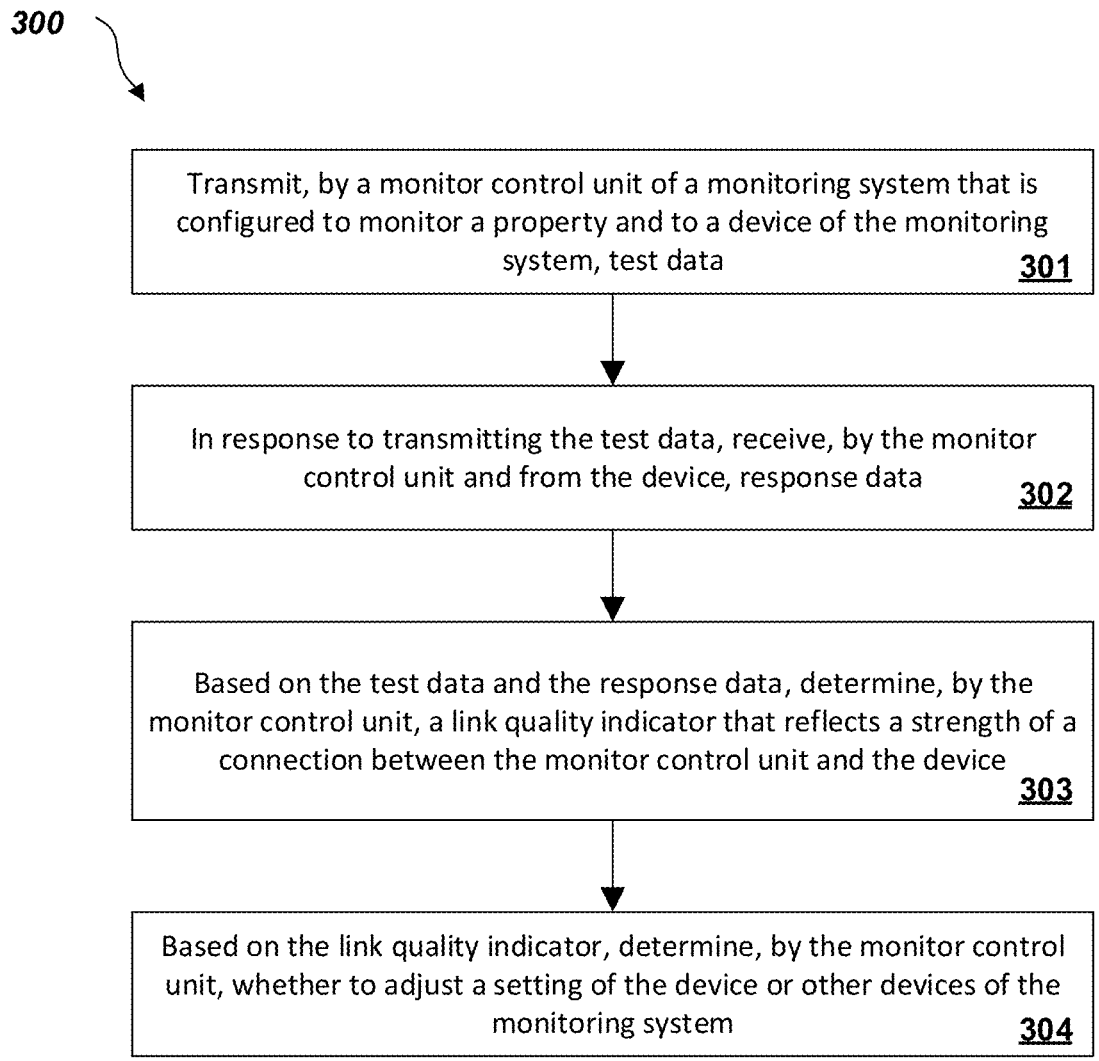
FIG. 3 is a flow chart illustrating an example of a method for testing mesh network connection quality.

FIG. 3 is a flowchart illustrating an example of a method 300 for testing mesh network connection quality. Method 300 can be performed by one or more electronic systems, for example, the monitoring system control unit 101 of FIG. 1 and/or one or more of the components of the monitoring system 400 of FIG. 4. Briefly, a monitor control unit of a monitoring system that is configured to monitor a property transmits test data to a device of the monitoring system (301); in response to the test data, the monitor control unit receives, from the device, response data (302); based on the test data and the response data, the monitor control unit determines a link quality indicator that reflects a strength of a connection between the monitor control unit and the device (303); based on the link quality indicator, the monitor control unit determines whether to adjust a setting of the device or other devices of the monitoring system (304).

The monitor control unit transmits test data (301). In more detail, the monitor control unit sends test data to connected devices within the monitoring system through a network. Depending on implementations, the sending and reception of data can take place on either wireless or wired networks and involve various protocols. The monitoring system can be made up of any number of connected components and the test data can be of any form able to travel via a network.

In some implementations, transmitting the data includes obtaining a time window. For example, as discussed in FIG. 1, the monitor system control 101 transmits as many packets of test data as possible within a time window corresponding to a time interval to the test node, such as the living room light 105. In some implementations, the time window is an element used to compare two different connections. For example, the monitor system control 101 can test a first connection with the living room light 105 and send as many data packets as possible to the living room light 105 over a mesh network within a set time interval (e.g., 30 seconds). The monitor system control 101 can then test a second connection with another element and send as many data packets as possible to the other element over the mesh network within the same set time interval. A link quality indicator of the living room light 105 will likely be higher than a link quality indicator of the other element if the monitor system control 101 is able to successfully transmit more data packets to the living room light 105 than the other element within the set time interval.

By keeping the set time interval constant across multiple tests, the monitor system control 101 is able to compare connection strengths based on the number of data packets successfully transmitted within the set time interval. By sending as many data packets as possible within the time window, a test may be conducted more rapidly than a test that requires a number of data packets be successfully transmitted from a source, such as the monitor system control 101, to a test node, such as the living room light 105.

In some implementations, a time window is defined using a start time and an end time. For example, the monitor system control 101 can obtain a time window that defines a start time from which to begin sending test data to the living room light 105 and an end time at which to stop sending test data to the living room light 105. In some implementations, the start time and the end time of the time window are dynamically defined. For example, the start time can correspond to a current time and the end time can correspond to a current time plus a set time interval such as 30 seconds.

In some implementations, a first number of data packets of the test data that successfully reached the first connected component within a time window and a second number of data packets of the test data that did not successfully reach the first connected component within the time window are used to determine the link quality indicator. For example, the monitor system control 101 can send 10 data packets to the living room light 105 over the course of the 30 second time window. Of the 10 data packets, 10 successfully reach the living room light 105 and 0 do not successfully reach the living room light 105 as shown in the box 112 of FIG. 1. The values of 10 and 0 can be used to generate the link quality indicator.

In some implementations, the number of data packets that do not successfully reach the living room light 105 are recorded by a source conducting a connection test. For example, the monitor system control 101 can send a data packet to the living room light 105 and record that the data packet has been sent to the living room light 105. If the monitor system control 101 does not receive response data corresponding to the data packet, the monitor system control 101 can determine that the data packet did not successfully reach the living room light 105. Similarly, if the monitor system control 101 does receive response data corresponding to the data packet, the monitor system control 101 can determine that the data packet did successfully reach the living room light 105.

In some implementations, a timeout condition is used by the monitor system control 101. For example, after sending the data packet to the living room light 105, the monitor system control 101 waits for a predetermined amount of time for the corresponding response data. If the response data is not received by the monitor system control 101 within the predetermined amount of time, the monitor system control 101 can determine that the data packet did not successfully reach the living room light 105. Similarly, if the response data is received by the monitor system control 101 within the predetermined amount of time, the monitor system control 101 can determine that the data packet did successfully reach the living room light 105.

In response to the test data, the monitor control unit receives response data from the device (302). The response data can be of any form able to travel via a network. The response data can include, among other things, the route the test data took within the network, a signal representing transmission outcome (i.e. success, failure, indeterminate), information on aspects of the route, including alternate routes, the test data took within the network, time stamps (e.g., when packets were received, when packets reached destination), route duration, duration of individual segments of the route, details of components along the route, cumulative test data analytics on multiple test data samples, details of the test data itself, or other metadata (e.g., information about the system occupancy, time-adjacent results, arming state). Response data can also include information on itself in a similar manner as the response data can include information on the test data. For example, in some implementations, the reply may contain two sets of each item mentioned above. One set would correspond to the test data, the other would correspond to the response data. To use one particular parameter as an example, response data may contain the route information for the test data coming from the control unit to the destination node and also the route information of the response data being sent from the destination node back to the control unit.

In some implementations, the test data includes a number of data packets and the response data includes a number of response data packets. For example, the monitor system control 101 can transmit each data packet of the number of data packets included in the test data to the living room light 105. Similarly, the living room light 105 can transmit a response data packet for each data packet transmitted by the monitor system control 101 that successfully reaches the living room light 105.

In some implementations, the response data includes a route of one or more nodes in a mesh network used to transmit data to or from a source node in a connection test. For example, the monitor system control 101 can send a data packet corresponding to the test data to the test node, such as the living room light 105. As the data packet is transferred from node to node through the mesh network on a route to the living room light 105, each node that receives and transfers the data packet along the route can add a piece of data to the data packet, such as a piece of data that identifies the given node. When the living room light 105 receives the data packet, the living room light 105 can determine, based on information of one or more nodes added to the data packet, a communication route that was used to send the data packet from the monitor system control 101 to the living room light 105 over the mesh network. The living room light 105 can then send data corresponding to the determined route to the monitor system control 101 as part of the response data.

In some implementations, a given node along a route adds data corresponding to the transfer of a data packet. For example, the given node can include an identifier of the node. For another example, the given node can include an elapse time of transfer corresponding to when a data packet was received by the node and when the data packet was sent to the next node in the mesh network. In this way, the test node, such as the living room light 105 can receive the elapse time information from the data packet. The living room light 105 can send the elapse time information to the monitor system control 101 as response data and the monitor system control 101 can determine, based on the elapse time information, if one or more nodes of a given route are having performance issues such as if the one or more nodes correspond to elapse times above an elapse time threshold. For example, an elapse time threshold can be 1 second. If a node along a route of the mesh network takes longer than 1 second to transfer a data packet, the monitor system control 101 or another entity can determine, based on elapse time information recorded by the node, that the node does not satisfy the elapse time threshold and may require servicing or automatic adjustment. Similarly, the monitor system control 101 can determine, based on elapse time information, if another node in the route does satisfy the elapse time threshold and therefore likely does not require servicing or automatic adjustment.

In some implementations, the response data includes a first node link quality indicator of a first node. For example, the first node can be a node of one or more nodes of a route, such as path A of FIG. 1 that connects the monitor system control 101 to the living room light 105 within the mesh network. In some implementations, the living room light 105 obtains the first node link quality indicator of the first node where the first node link quality indicator includes a link quality indicator of the first node. For example, the first node of the route can add details of the first node link quality indicator to a data packet as the first node transfers the data packet. The living room light 105 can send data corresponding to the first node link quality indicator of the first node to the monitor system control 101 as part of the response data received by the monitor system control 101.

In some implementations, the monitor system control 101 uses a link quality indicator threshold. For example, the node 204 in the example of FIG. 2, does not satisfy the determined threshold. In this case, the threshold is 0.70 and the link quality indicator of the node 204 is 0.64. In some implementations, the monitor system control 101 determines the link quality indicator of the node 204 does not satisfy the threshold based on comparing the link quality indicator of the node 204 to the link quality threshold. For example, the monitor system control 101 compares the value 0.64 of the link quality indicator corresponding to the node 204 to the threshold 0.70 and, based on a comparison, determines that the link quality indicator corresponding to the node 204 does not satisfy the threshold.

In some implementations, the monitor system control 101 performs actions based on one or more determined thresholds. For example, the monitor system control 101 can use a determined link quality indicator threshold to determine that a given node does not satisfy the determined link quality indicator threshold. Based on the given node not satisfying the determined link quality indicator threshold, the monitor system control 101 can perform an action of connection diagnostics or another action, such as adjusting a setting of the given node. For example, in some cases, the monitor system control 101 can perform connection diagnostics that include checking parameters of a given node such as power level, link quality indicator, or other related parameters. For another example, the monitor system control 101 can adjust the power of a given node based on the given node not satisfying a given power threshold.

In some implementations, the response data includes analytic indicators. For example, the analytic indicators can include information of one or more nodes in the mesh network including link quality indicators, power levels, data packet transfer time elapse, node identifiers, among others. In the example of FIG. 1, the monitor system control 101 can use the one or more types of analytic indicators to generate a link quality indicator for a given test node. In some implementations, the link quality indicator is a weighted summation of one or more types of analytic indicators. For example, the monitor system control 101 can generate a link quality indicator of the living room light 105 based on performing a summation of a number of routes, such as a number of unique routes, used by one or more data packets of the test data, an average value of link quality indicators along one or more routes, a number of data packets that were successfully received by the living room light 105, and a time window within which the data packets were sent to the living room light 105. In other implementations, other calculations are performed based on the analytic indicators to generate a link quality indicator. For example, the monitor system control 101 can average one or more values before performing a weighted summation of the analytic indicators. In general, any mathematical operation can be used on one or more analytic indicators in order to generate a link quality indicator.

Based on the test data and the response data, the monitor control unit determines a link quality indicator that reflects a strength of a connection between the monitor control unit and the device (303). The analysis can be performed via internal computers within the monitoring system or external computers able to communicate with the monitoring system. The computer may run algorithms, models, neural networks, employ machine learning tactics or other such computational methods to determine, based on expected and/or ideal performance, an indication of quality. Computational methods can also be combined. The indication of quality can be applied to the connection currently being tested but can also be used in other tests, data sets, and computation within the monitoring system and components shown in FIG. 4. The indication of quality determined can take many forms including numbers, graphics or symbols. Any indication may be accompanied by a range or legend explaining the scale or other determination methods used. Numbers, graphics or symbols can be associated with varying degrees of connection strength within the network. Numbers, graphics or symbols depicting the link quality indicator (LQI) of the system can be associated with precautions, instructions or other information related to the network.

Based on the link quality indicator, the monitor control unit determines whether to adjust a setting of the device or other devices of the monitoring system (304). This determination can be based on algorithms, models, neural networks, machine learning tactics or other such computational methods performed via internal computers within the monitoring system or external computers able to communicate with the monitoring system. Computational methods can also be combined. The setting to be adjusted can be any existing system parameter including power levels of components, available protocols, which programs run on the components, power levels of the system, adjustments within component programs (e.g. stop, start, pause, edits), power status of component (e.g. on, off), physical location of components, and others.

In some implementations, one or more routes are compared by a control unit. For example, the monitor system control 101 can obtain response data from the living room light 105 that includes one or more node identifiers. Based on the node identifiers, the monitor system control 101 can determine a first route through the mesh network corresponding to a given data packet. The first route can include one or more node identifiers. The monitor system control 101 can determine a second route through the mesh network corresponding to a second given data packet. The second route can also include one or more node identifiers. The monitor system control 101 can compare the one or more node identifiers of the first route to the one or more node identifiers of the second route to determine that the first route and the second route are different. In response to determining that the first route and the second route are different, the monitor system control 101 can increment a value corresponding to a route counter.

In some implementations, the route counter corresponds to route changes. For example, if the monitor system control 101 determines a first route corresponding to path A of FIG. 1, then a second route corresponding to path B of FIG. 1, then a third route corresponding to path C of FIG. 1, then a fourth route corresponding to path C of FIG. 1, the monitor system control 101 can increment the route counter only when the route changes for adjacent data packets. The first route and the second route correspond to different nodes as defined by path A and path B of FIG. 1. The monitor system control 101 can increment the route counter in response to determining the first route and the second route are different by comparing the node identifiers corresponding to the first route and the second route. The monitor system control 101 can similarly increment the route counter in response to determining the second route and the third route are different. The third route and the fourth route are not different. The monitor system control 101 can determine the third route and the fourth route are not different by comparing the node identifiers corresponding to the third route and the fourth route. In response, the monitor system control 101 does not increment the route counter.

In some implementations, the method includes sending a data signal to a connected component. For example, the monitor system control 101 can send configured data that is configured to enable a display of a user device to represent the link quality indicator. The user device can show a representation of the link quality indicator. For example, the user device, based on the configured data, can show a representation of the link quality indicator using a specific color such as red corresponding to a link quality indicator that does not satisfy a threshold or green corresponding to a link quality indicator that satisfies a threshold. For another example, the user device, based on the configured data, can show a representation of the link quality indicator using numerical values. For another example, the user device, based on the configured data, can show a representation of the link quality indicator using a graphical element showing one or more nodes of the mesh network, information of the nodes, and connection information of the nodes in the mesh network. In some implementations, the graphical element can be an interactive graphical user interface that shows relevant information of the mesh network, including one or more link quality indicators, based on input from the user at the user device.

In some implementations, the test data is sent at a specific power level by the control unit. For example, the monitor system control 101 can determine a minimum power to send data through the mesh network to a test node such as the living room light 105 by sending multiple data packets at different power levels to the test node and comparing the results of sending the multiple data packets to determine what power level is sufficient. Analytic indicators can be used to determine which power level of the multiple power levels is sufficient where sufficient corresponds to a threshold value corresponding to a level of successful communication with the test node such as a specific number of successfully received data packets by the test node within a given time window or another analytic indicator.

In some implementations, the power level that is sufficient is less than a default power level. For example, by performing transmissions of data packets at multiple power levels, the monitor system control 101 can adjust the default power level to send data to the test node or another node in the mesh network thereby decreasing overall power usage of data transfer over the mesh network. This may be advantageous for a consumer or business in that the mesh network will consume less power. In some cases, operational costs can be reduced.

In some implementations, the control unit adjusts a setting of a node included in a route to the test node. For example, the monitor system control 101 can obtain response data from the living room light 105 that includes a power level of a first node included in a route from the monitor system control 101 to the living room light 105. The monitor system control 101 can then compare the power level of the first node to a predetermined power threshold. If the power level of the first node does not satisfy the predetermined power threshold, the monitor system control 101 can send a signal configured to adjust the power of the first node to the first node in order to adjust the power level of the first node.

In some implementations, additional settings of a device can be added or changed. The setting, or multiple settings, can be adjusted automatically via control signals sent within the monitoring system originating from either inside or outside of the monitoring system. The settings can also be adjusted via user action. The system can alert the user when manual action is required. The system can also alert users when the system performed automatic adjustments. These alerts can include images or text which depict the action, possible solution(s), solution performed, and/or user actions required.

Figure 4:
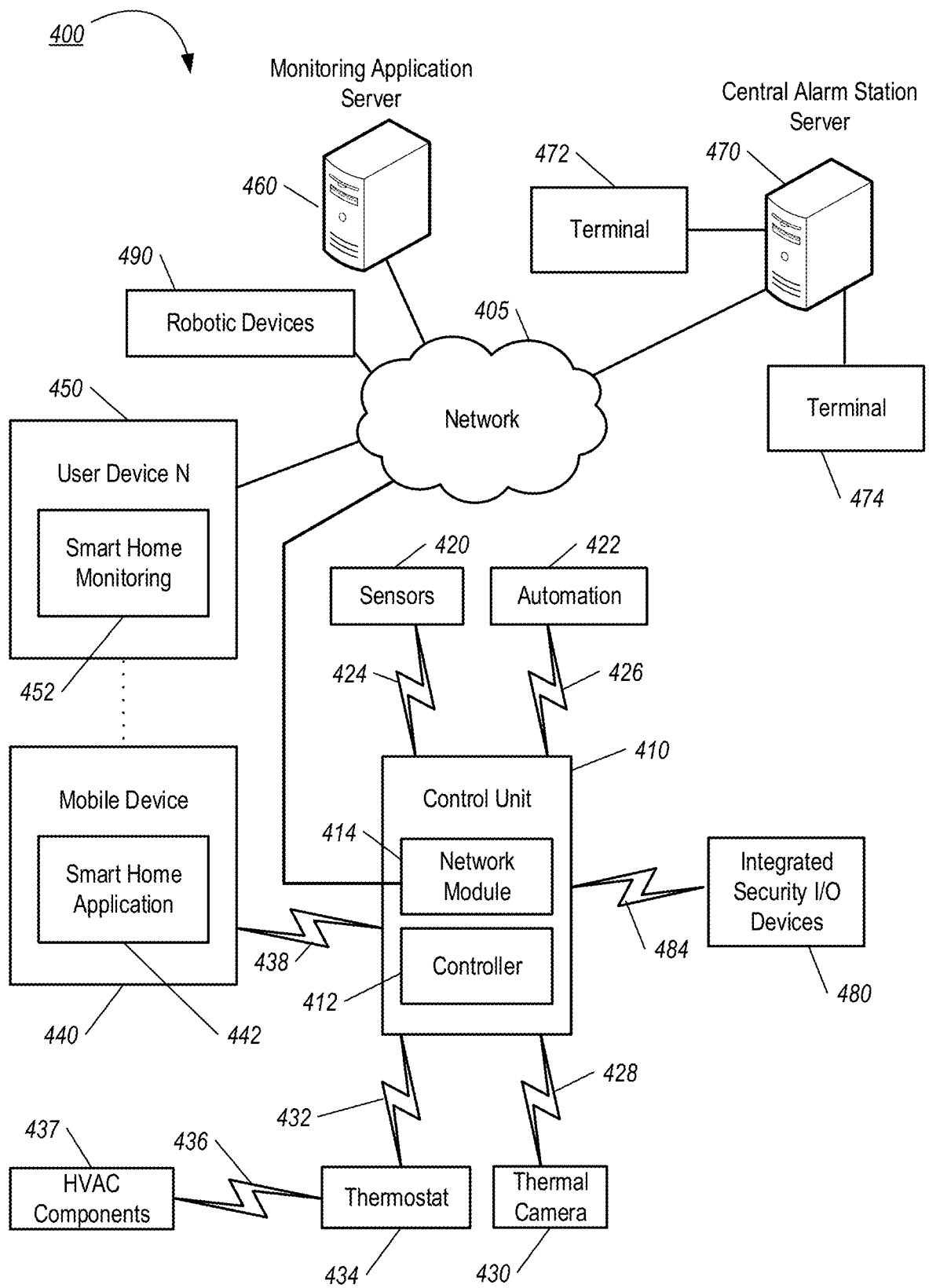
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit, and/or another computer system of the monitoring system 400 can process and analyze.

The system 400 also includes one or more property automation controls 422 that communicate with the control unit to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 49 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    transmitting, by a control unit of a monitoring system that is configured to monitor a property, test data to a first connected component of the monitoring system;
    in response to transmitting the test data, receiving, by the control unit, response data from the first connected component of the monitoring system;
    determining, by the control unit using the response data, a number of different unique routes a) used to transmit the test data to the first connected component and b) that each include two or more nodes, the combination of the two or more nodes for each of the unique routes being different than a combination of two or more nodes for any other of the unique routes;
    generating, by the control unit and using a value indicating the number of unique routes, a link quality indicator that reflects a strength of a connection between the control unit and the first connected component; and
    based on the link quality indicator, adjusting, by the control unit, one or more settings of the connection between the control unit and the first connected component.

2. The method of claim 1, further comprising:
    for each of two or more data packets of the test data:
        obtaining, by the control unit, a first route comprising a first set of one or more nodes in a mesh network that were used to transfer a first data packet of the test data from the control unit to the first connected component;
        obtaining, by the control unit, a second route comprising a second set of one or more nodes in the mesh network that were used to transfer a second data packet of the test data from the control unit to the first connected component;
        determining, by the control unit, whether the first route and the second route are different;
        in response to determining that the first route and the second route are different, incrementing, by the control unit, a value of a route counter by a determined value; and
        in response to determining that the first route and the second route are not different, determining, by the control unit, not to increment the value of the route counter by the determined value.

3. The method of claim 1, wherein transmitting the test data comprises:
    obtaining, by the control unit, a time window comprising a starting time and an ending time; and
    transmitting, by the control unit, the test data to the first connected component of the monitoring system from the starting time until the ending time.

4. The method of claim 3, further comprising:
    determining, by the control unit, a first number of data packets of the test data that successfully reached the first connected component within the time window and a second number of data packets of the test data that did not successfully reach the first connected component within the time window based on the response data; and
    generating, by the control unit, the link quality indicator based on the first number of data packets and the second number of data packets.

5. The method of claim 3, further comprising:
    generating, by the control unit, a successful transmission rate based on a number of data packets that successfully reach the first connected component within the time window; and
    generating, by the control unit, the link quality indicator based on the successful transmission rate.

6. The method of claim 1, further comprising:
    generating, by the control unit and based on the link quality indicator, configured data that is configured to enable a display of a user device to represent the link quality indicator; and
    sending, by the control unit, the configured data to the user device.

7. The method of claim 1, wherein the test data comprises a plurality of data packets and the response data comprises a number of response data packets corresponding to one or more data packets of the plurality of data packets that successfully arrived at the first connected component.

8. The method of claim 1, wherein the response data comprises at least two different routes of one or more nodes in a mesh network that were used to transfer at least part of the test data from the control unit to the first connected component.

9. The method of claim 8, wherein each of the at least two different routes include a list of one or more values representing one or more nodes, and wherein a value of the list of one or more values is generated by a second connected component that connects the control unit to the first connected component as a node within a route of the mesh network.

10. The method of claim 8, wherein the response data further comprises a first node link quality indicator of a first node of the one or more nodes in a route and the method further comprises:
    determining, by the control unit, that the first node link quality indicator does not satisfy a determined link quality indicator threshold; and
    in response to determining that the first node link quality indicator does not satisfy the determined link quality indicator threshold, performing, by the control unit, connection diagnostics.

11. The method of claim 10, wherein the connection diagnostics comprise determining a power level of the first node and comparing the power level of the first node to a power level threshold.

12. The method of claim 8, wherein the response data further comprises a first node power level of a first node of the one or more nodes in a route and the method further comprises:
- determining, by the control unit, that the first node power level does not satisfy a determined power level threshold; and
- in response to determining that the first node power level does not satisfy the determined power level threshold, adjusting, by the control unit, a power level of the first node.

13. The method of claim 1, wherein the response data comprises a plurality of analytic indicators, and wherein generating the link quality indicator comprises combining two or more analytic indicators of the plurality of analytic indicators to generate the link quality indicator.

14. The method of claim 13, wherein the plurality of analytic indicators comprise a route counter value that represents a number of routes that were used to transfer the test data from the control unit to the first connected component through a mesh network, wherein each route of the number of routes corresponds to a set of one or more nodes in the mesh network.

15. The method of claim 1, wherein adjusting the one or more settings of the connection between the control unit and the first connected component comprise:
- sending, by the control unit, a signal to a second connected component that connects the control unit and the first connected component, wherein the signal is configured to adjust a power level of the second connected component.

16. The method of claim 1, wherein transmitting the test data to the first connected component of the monitoring system comprises:
- determining, by the control unit, a first power level for a first data packet of the test data; and
- transmitting, by the control unit, the first data packet of the test data using the first power level.

17. A system comprising one or more computers and one or more storage devices on which are stored instructions that are operable, when executed by the one or more computers, to cause the one or more computers to perform operations comprising:
- transmitting, by a control unit of a monitoring system that is configured to monitor a property, test data to a first connected component of the monitoring system;
- in response to transmitting the test data, receiving, by the control unit, response data from the first connected component of the monitoring system;
- determining, by the control unit using the response data, a number of different unique routes a) used to transmit the test data to the first connected component and b) that each include two or more nodes, the combination of the two or more nodes for each of the unique routes being different than a combination of two or more nodes for any other of the unique routes;
- generating, by the control unit and using a value indicating the number of unique routes, a link quality indicator that reflects a strength of a connection between the control unit and the first connected component; and
- based on the link quality indicator, adjusting, by the control unit, one or more settings of the connection between the control unit and the first connected component.

18. The system of claim 17, wherein the operations further comprise:
- for each of two or more data packets of the test data:
  - obtaining, by the control unit, a first route comprising a first set of one or more nodes in a mesh network that were used to transfer a first data packet of the test data from the control unit to the first connected component;
  - obtaining, by the control unit, a second route comprising a second set of one or more nodes in the mesh network that were used to transfer a second data packet of the test data from the control unit to the first connected component;
  - determining, by the control unit, whether the first route and the second route are different;
  - in response to determining that the first route and the second route are different, incrementing, by the control unit, a value of a route counter by a determined value; and
  - in response to determining that the first route and the second route are not different, determining, by the control unit, not to increment the value of the route counter by the determined value.

19. The system of claim 17, wherein transmitting the test data comprises:
- obtaining, by the control unit, a time window comprising a starting time and an ending time; and
- transmitting, by the control unit, the test data to the first connected component of the monitoring system from the starting time until the ending time.

20. A non-transitory computer storage medium encoded with instructions that, when executed by one or more computers, cause the one or more computers to perform operations comprising:
- transmitting, by a control unit of a monitoring system that is configured to monitor a property, test data to a first connected component of the monitoring system;
- in response to transmitting the test data, receiving, by the control unit, response data from the first connected component of the monitoring system;
- determining, by the control unit using the response data, a number of different unique routes a) used to transmit the test data to the first connected component and b) that each include two or more nodes, the combination of the two or more nodes for each of the unique routes being different than a combination of two or more nodes for any other of the unique routes;
- generating, by the control unit and using a value indicating the number of unique routes, a link quality indicator that reflects a strength of a connection between the control unit and the first connected component; and
- based on the link quality indicator, adjusting, by the control unit, one or more settings of the connection between the control unit and the first connected component.

* * * * *